United States Patent [19]

Dzewaltowski et al.

[11] Patent Number: 4,513,540
[45] Date of Patent: Apr. 30, 1985

[54] GRINDING MACHINE WITH CNC PIVOTABLE WORKHEAD

[75] Inventors: Victor F. Dzewaltowski; Robert N. Hobbs, both of Springfield, Vt.

[73] Assignee: Ex-Cell-O Corporation, Troy, Mich.

[21] Appl. No.: 512,836

[22] Filed: Jul. 11, 1983

[51] Int. Cl.³ .............................................. B24B 49/00
[52] U.S. Cl. .............................. 51/165.71; 51/165.75; 51/96; 51/97 R
[58] Field of Search ................... 51/97 R, 96, 165.75, 51/165.93, 169.71, 165 TP, 165.77

[56] References Cited

U.S. PATENT DOCUMENTS

| | | | |
|---|---|---|---|
| 2,029,510 | 2/1936 | Steiner | 51/97 R |
| 2,880,407 | 3/1959 | Comstock | 51/165.75 |
| 2,971,263 | 2/1961 | Rockafellow | 51/165.75 |
| 3,197,921 | 8/1965 | Hohler | 51/165.93 |
| 3,874,121 | 4/1975 | Kikuchi | 51/105 R |
| 4,115,956 | 9/1978 | Huffman | 51/96 |
| 4,186,529 | 2/1980 | Huffman | 51/165 TP |
| 4,293,913 | 10/1981 | Nishimura | 51/165.71 |

Primary Examiner—Harold D. Whitehead
Attorney, Agent, or Firm—Edward J. Timmer

[57] ABSTRACT

A grinding machine is provided with a workhead support means having pivotable shaft means on which the support means is pivoted by a servomotor/pinion arrangement controlled by a programmable controller and a position indicating means on the pivotable shaft means that inputs angular shaft position signals to the controller. Adaptive control components may also be included in the control arrangement. The workhead support means is thereby pivotable to vary the angular relationship of the workpart axis to the grinding wheel axis to effect a desired taper or contour grind or to compensate for changes in grinding parameters causing out of tolerance ground workparts. Special releasable clamps are provided to fix a desired position of the workhead support means and yet release same for pivoting movement. Fluid lift mechanisms are also provided to reduce friction between the workhead support means and the adjacent machine base member during pivoting.

9 Claims, 11 Drawing Figures

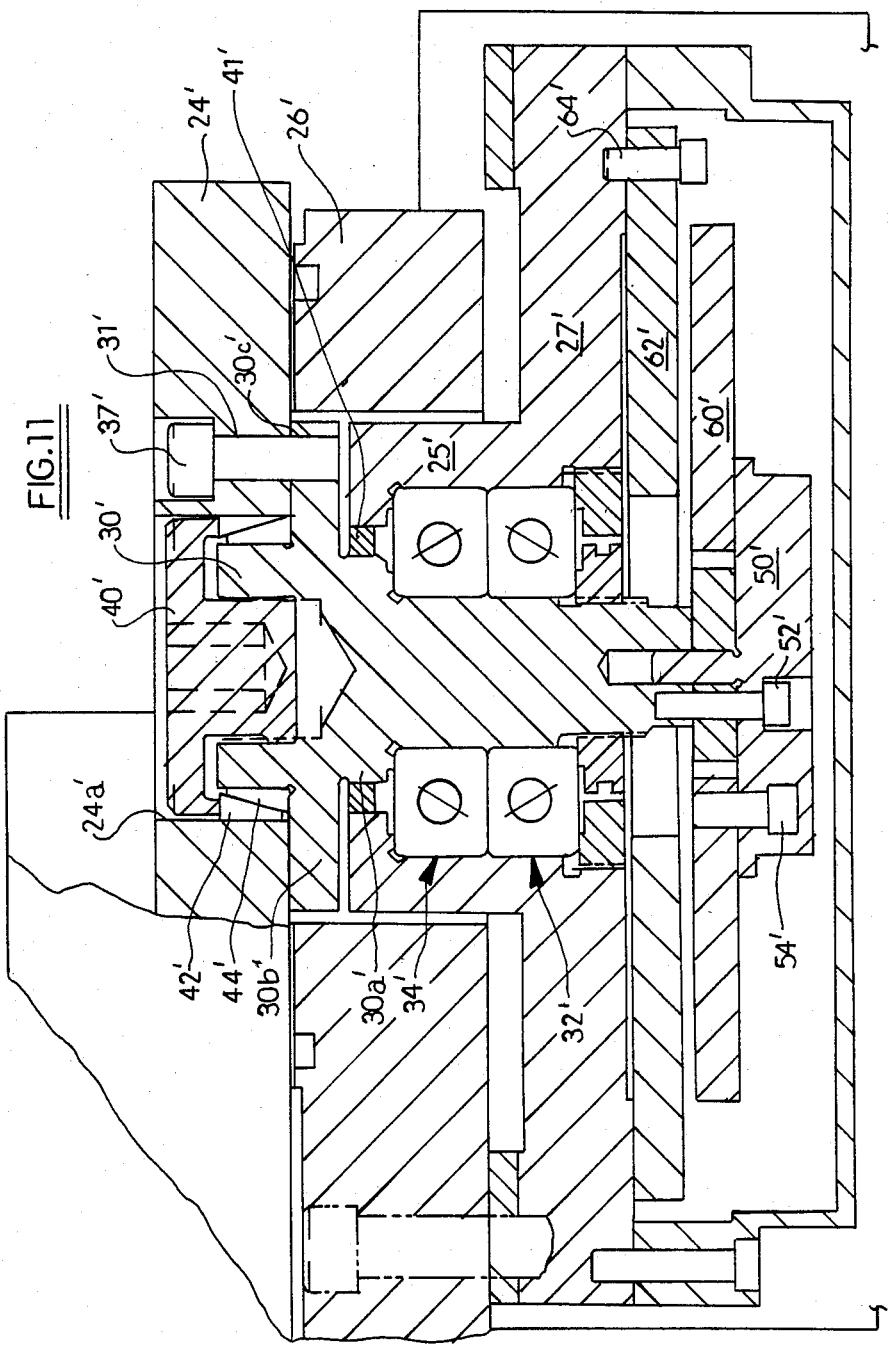

GRINDING MACHINE WITH CNC PIVOTABLE WORKHEAD

FIELD OF THE INVENTION

The present invention relates to grinding machines and, in particular, to grinding machines having means to adjust the positional relationship between a grinding wheel carried on a wheelhead and a workpart held on a workhead especially in a programmed or adaptively controlled manner.

BACKGROUND OF THE INVENTION

In the known centerless grinding process for workparts such as bearing raceways, the axes of the workpart and grinding wheel may have to be varied relative to one another in some cases to grind a particular taper on the workpart and in other cases to compensate for wheel deflection or wear or other fluctuations in grinding process parameters during a run causing out of tolerance workparts.

In one commercially available centerless grinding machine, the ability to adjust the axes of the workpart and grinding wheel is provided by mounting the workhead on a pivotable plate. The plate is pivotable about a stationary pivot stud extending between the plate and a cross-slide mounted on the machine base. The cross-slide includes a semi-circular shaped inverted T-slot to receive a pair of T-nuts. Locking screws extend from the workhead into the T-nuts and are manually tightened to lock the position of the workhead and thus the orientation of the workpart axis relative to the axis of the grinding wheel mounted on another cross-slide. Other than the placement of lubricant between the workhead support plate and cross-slide supporting the plate, no provision is made for reducing friction therebetween during pivoting.

To vary the relationship of the workpart axis and grinding wheel axis from parallel to angular to intentionally taper grind or to compensate for changes in grinding parameters, the operator must manually loosen the locking screws and manually turn an adjusting screw which is screw mounted on the workhead cross-slide and engages the support plate. As the adjusting screw is turned, the support plate is pivoted about the pivot stud to the desired position. An indicator dial driven by the rotation of the adjusting screw can be read to determine when the angular relationship of the workpart axis to the grinding wheel axis is established. Thereafter, the locking screws are re-tightened by the operator to maintain the adjusted position. Of course, this adjustment sequence for placing the workpart axis and grinding wheel axis in related angular relationship is time consuming and costly.

U.S. Pat. No. 3,874,121 issued Apr. 1, 1975 shows an internal grinding machine having a swivel base on which a spindle is carried so that the spindle axis can be adjusted angularly.

U.S. Pat. Nos. 4,186,529 and 4,115,956, issued Feb. 5, 1980 and Sept. 26, 1978, respectively, illustrate a programmably controlled machine with a grinding wheel support system and workpart support system each having a plurality of slides and cross-slides and a rotary table driven by individual servomotors for grinding end cutting tools and the like.

U.S. Pat. No. 4,293,913, issued Oct. 6, 1981, discloses a numerical controller for a grinding machine for cylindrical workparts.

SUMMARY OF THE INVENTION

The present invention in a typical working embodiment provides a grinding machine having (a) a workhead support means with a pivotable means, such as a pivotably mounted shaft, on which the workhead support means is pivoted to vary the angular relationship of the workpart axis relative to the grinding wheel axis, (b) a means such as a servomotor/pinion arrangement for pivoting the workhead support means and the pivotable shaft means and (c) a means for controlling the angular position of the workhead support means and workhead thereon including position indicating means for determining the angular position of the workpart axis by determining angular or rotational movement of the pivotable means of the workhead support means with respect to a reference position and means for actuating the pivoting means until the position indicating means indicates that a position is reached corresponding to a desired angular relationship of the workpart axis to the grinding wheel axis.

The controlling means preferably includes a programmable controller and the pivoting means, such as the servomotor, is under the control of the programmable controller so as to pivot the workhead support means in an incremental step sequence or in a substantially continuous manner until the position indicating means indicates that a position is reached corresponding to a programmed angular relationship of the workpart axis to the grinding wheel axis.

Preferably, the position indicating means comprises a rotor of a feedback transducer connected to the pivotable shaft means of the workhead support means and an adjacent stator connected to a fixed machine member, thereby providing minimal looseness and elastic wind-up in the position indicating system and reduction of angular positioning errors associated therewith.

In one embodiment of the invention, the controlling means also includes an adaptive control system having a gaging means for measuring one or more grinding parameters and the servomotor is responsive to the gaging means to pivot the workhead support means until the position indicating means indicates that a position is reached corresponding to an angular relation of the workpart axis to the grinding wheel axis providing the desired grinding parameter.

In a particularly preferred embodiment of the invention, a releasable clamp means is provided between the workhead support means and machine base means for clamping the support means to the machine base means to maintain a desired position and yet is releasable to allow pivoting of the support means relative to the base means to another position.

In still another particularly preferred embodiment of the invention, a lift means such as fluid pressure means is provided between the workhead support means and the machine base means to reduce friction therebetween during pivoting of the support means, assuring that the servomotor pivoting means can position the support means to within the resolution of the positioning indicating means.

Other object and advantages of the present invention will be apparent to those skilled in the art in view of the following drawings and detailed description.

BRIEF DESCRIPTION OF THE DRAWINGS

FIG. 11 is similar to FIG. 5 but of a more preferred pivotable shaft/bearing arrangement.

DESCRIPTION OF PREFERRED EMBODIMENTS

Figure 1:
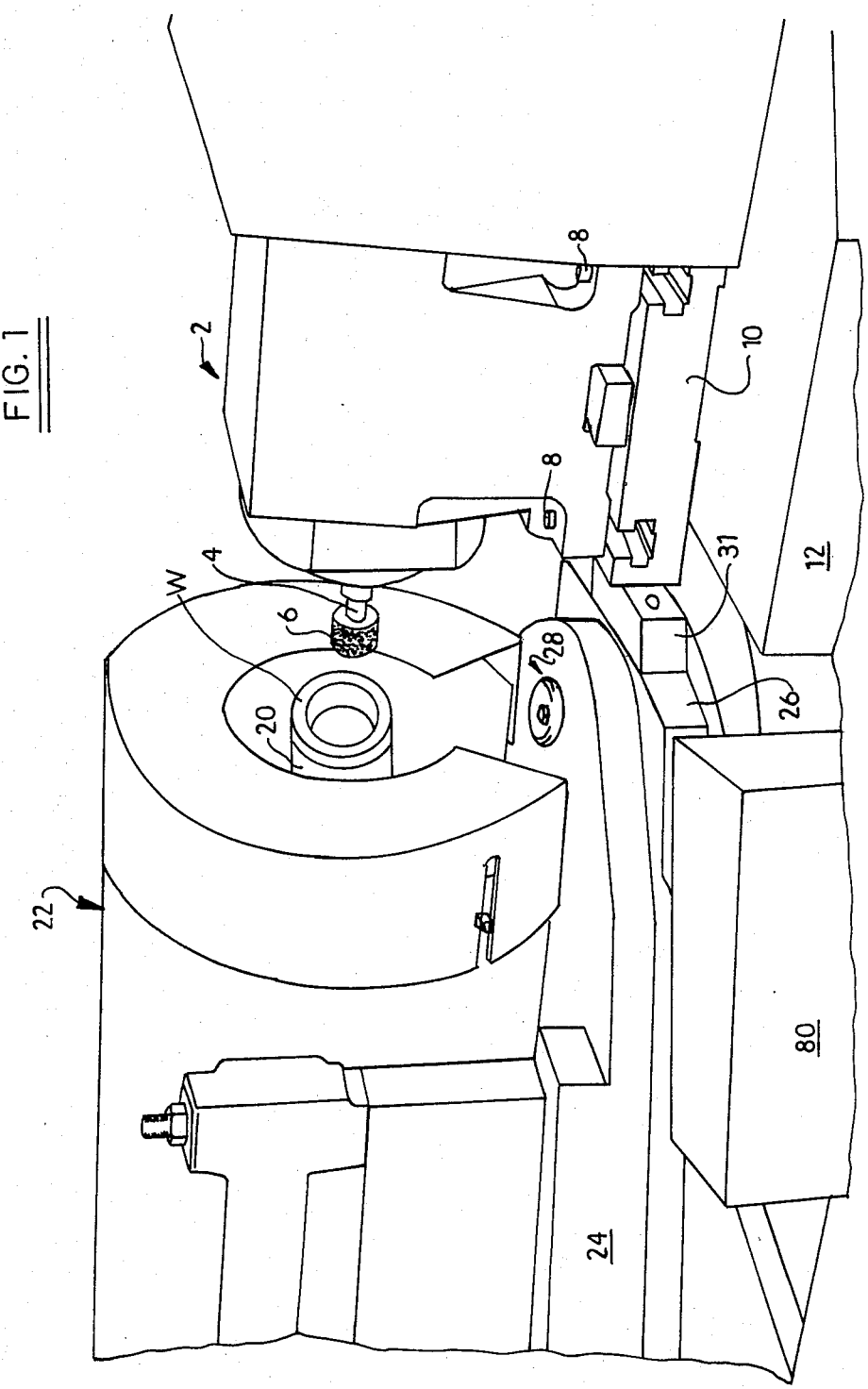
FIG. 1 is a partial perspective view showing the workhead and wheelhead.

FIG. 1 shows in partial view a grinding machine constructed in accordance with the present invention for grinding the internal diameter of annular workpart W which may be for example a bearing raceway. It is apparent that the grinding machine includes a wheelhead 2 in which a rotatable spindle 4 having a grinding wheel 6 is rotatably supported in known manner and driven by known means such as electric motor/drive belt arrangement (not shown). The wheelhead 2 is mounted such as by bolts 8 on a transverse support member 10 that is moved on a transverse cross-slide member 13 for movement transverse to workpart W. Slide 13 in turn is supported on a longitudinal slide (not shown) for movement toward or away from workpart W.

The workpart W is held to a magnetic chuck 20 or other workpart holding or fixturing device rotatably mounted on the workhead 22. The workhead 22 in turn is bolted or otherwise attached to workhead support plate 24 which is pivotably mounted on base member 26 by a pivotable shaft/bearing arrangement 28 described in more detail herebelow.

Figure 4:
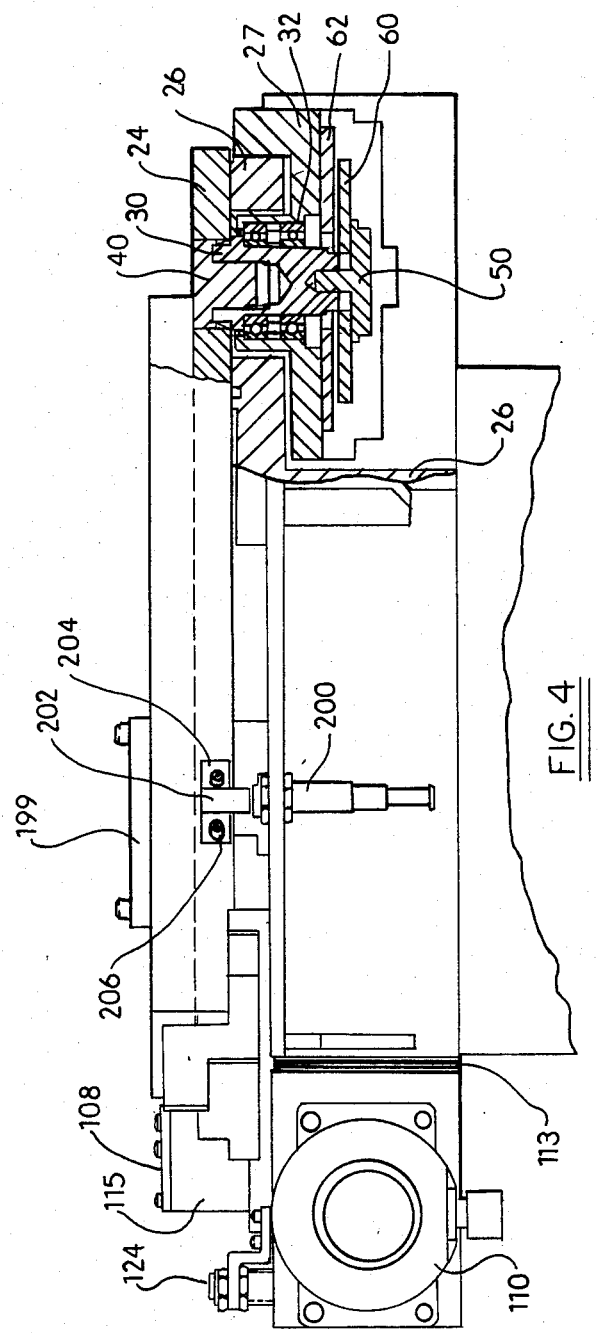
FIG. 4 is a longitudinal plan view, partially in cross-section, of the support means and associated components shown in FIGS. 2 and 3.
Figure 5:
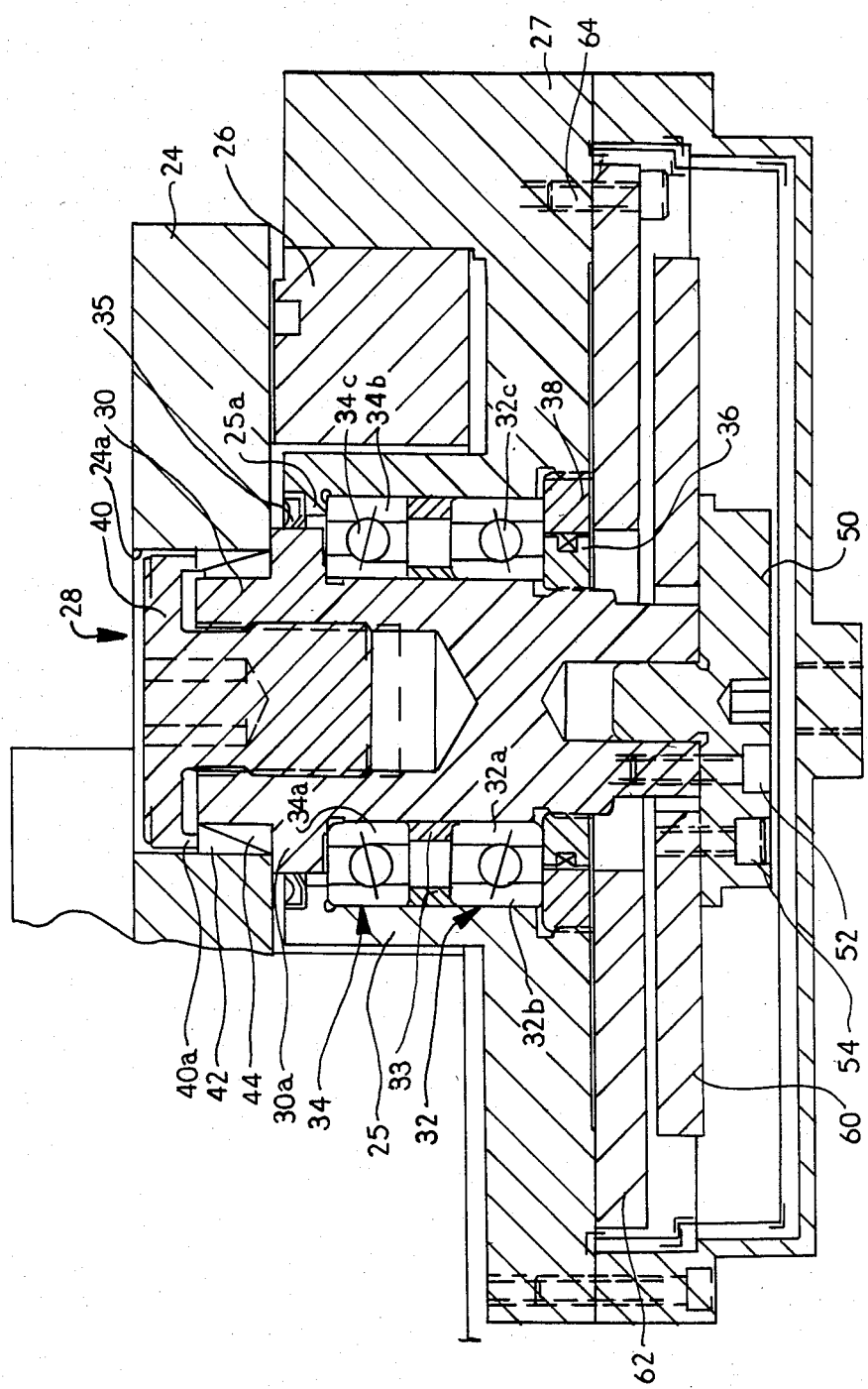
FIG. 5 is an enlarged partial cross-sectional view of the pivotable shaft/bearing arrangement for the support plate along with the position indicating rotor/stator.
Figure 6:
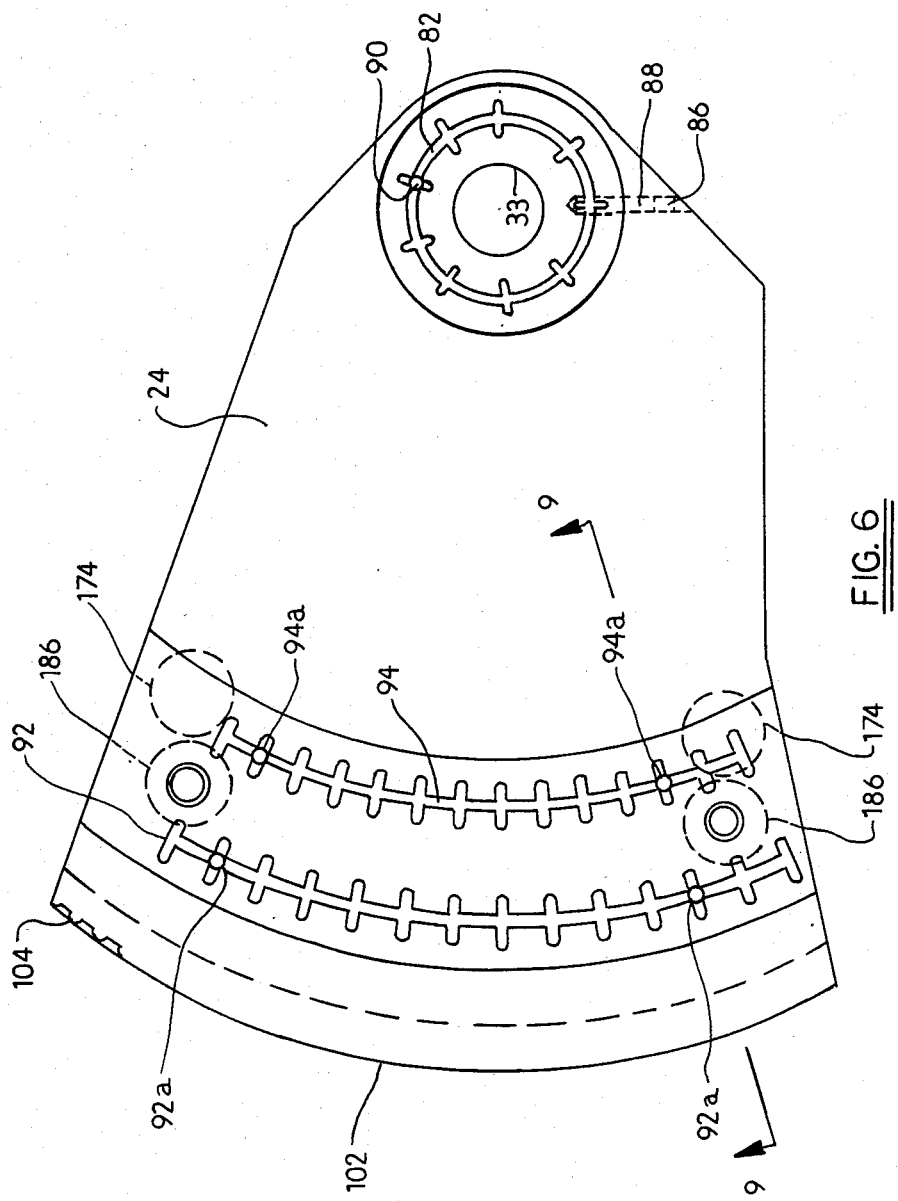
FIG. 6 is a bottom plan view of the workhead support means.

The workhead support plate 24 is shown in FIG. 6 and the pivotable shaft/bearing arrangement 28 for pivotably mounting the plate 24 on base member 26 is shown in FIG. 4 and in more detail in FIG. 5. It is apparent that the pivotable arrangement 28 includes a central pivot shaft or spindle 30 rotatably or pivotably supported vertically in tubular portion 25 of secondary base member 27 by two bearings 32, 34 having inner races 32a, 34a, outer races 32b, 34b and balls 32c, 34c therebetween and spacers 33. The secondary base member 27 is bolted to the base 26. The bearing 32 is positioned at its lower end by locking collars 36, 38, collar 38 being threaded to the secondary base portion 27. Bearing 34 is positioned at its upper end by an inwardly extending radial shoulder 25a on the tubular base portion 25.

The support plate 24 is affixed to the pivotable shaft 30 by means of cap screw 40 threaded to the shaft as shown and truncated conical annular bushings 42, 44 which are engaged by the cap lip 40a and wedged axially against the shaft shoulder 30a supported by bearings 32, 34 and radially against the wall defining bore 24a in the plate 24 to center the pivot shaft on spindle 30. As a result, the bushings 42, 44, as compressed, reduce radial and axial movement between the plate and shaft to a minimum at the connection.

FIG. 11, in which like numerals primed represent like features, illustrates an even more preferred technique for affixing the support plate 24' to the pivot shaft or spindle 30'. In particular, the support plate includes a plurality of bores 31' (only one shown) partially threaded along their lengths and spaced circumferentially around the bore 24a' in the plate. The pivot shaft or spindle 30' includes a small diameter shoulder 30a' supported by the bearings 32', 34' with an annular seal 41' preventing foreign matter from entering the bearings and a larger diameter shoulder 30b' having a plurality of threaded bores 30c' coaxially aligned with bores 31' in the support plate 24'. A threaded screw 37' is threadably received in the aligned bores 31' and 30c' to attach the support plate to the large diameter shoulder 30b'. Cap screw 40' and bushings 42', 44' function to center the shaft 30' in the plate bore 24a'. This support plate/pivot shaft arrangement is capable of withstanding an impact force, such as one that might occur during a machine malfunction, without a position error occurring.

The lower end of shaft 30 includes an end cap 50 attached as by screws 52 (only one shown) to the shaft and by screws 54 (only one shown) to an annular rotor 60 of a rotary position feedback transducer system. The rotor 60 is thereby directly attached to the shaft 30 and pivotable or rotatable with the shaft 30 and plate 24. An annular stator 62 is shown affixed to secondary base member 27 by screws 64 (only one shown) in spaced axial relation to the rotor.

Figure 2:
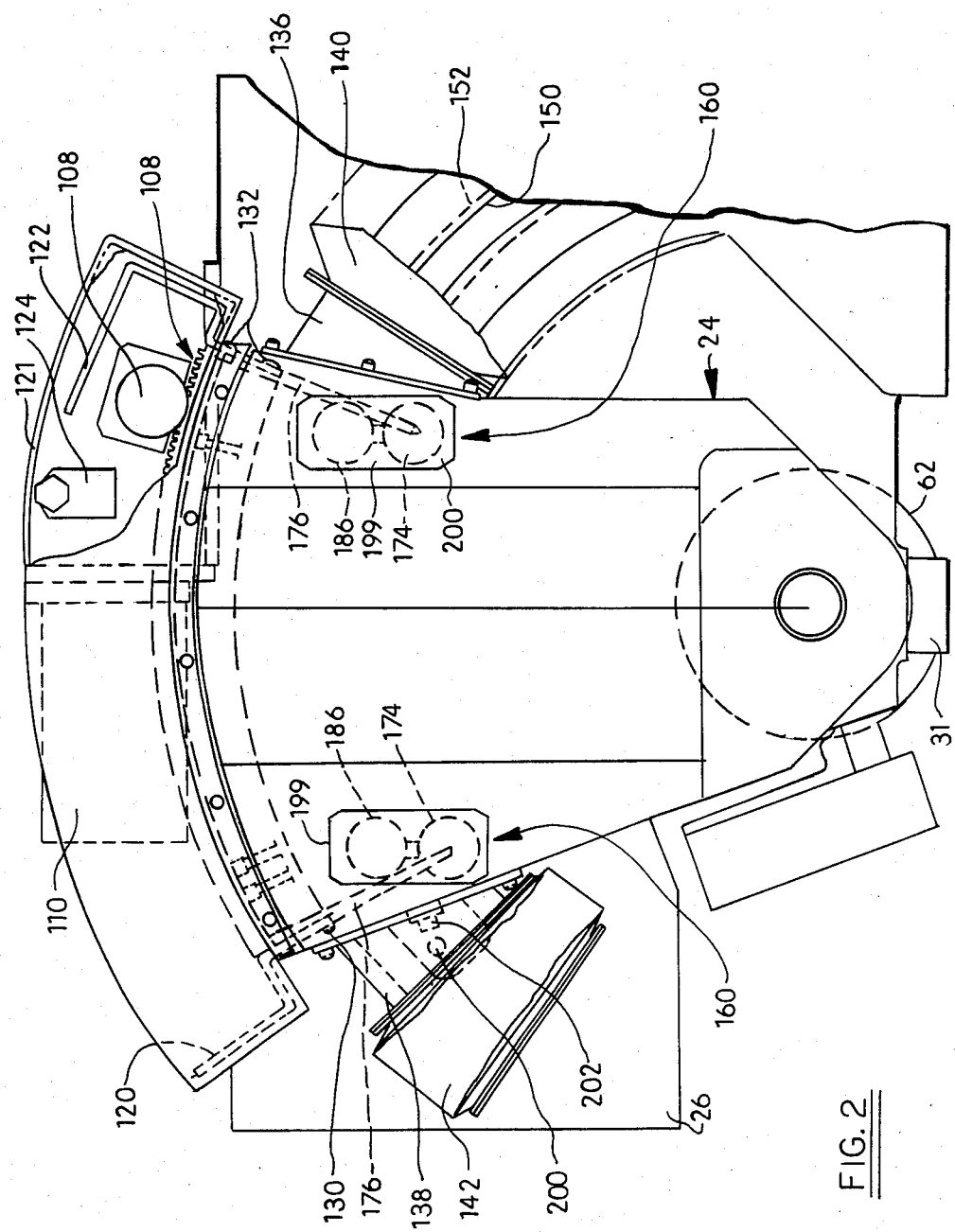
FIG. 2 is a top plan view of the workhead support means and associated components with the workhead removed.
Figure 3:
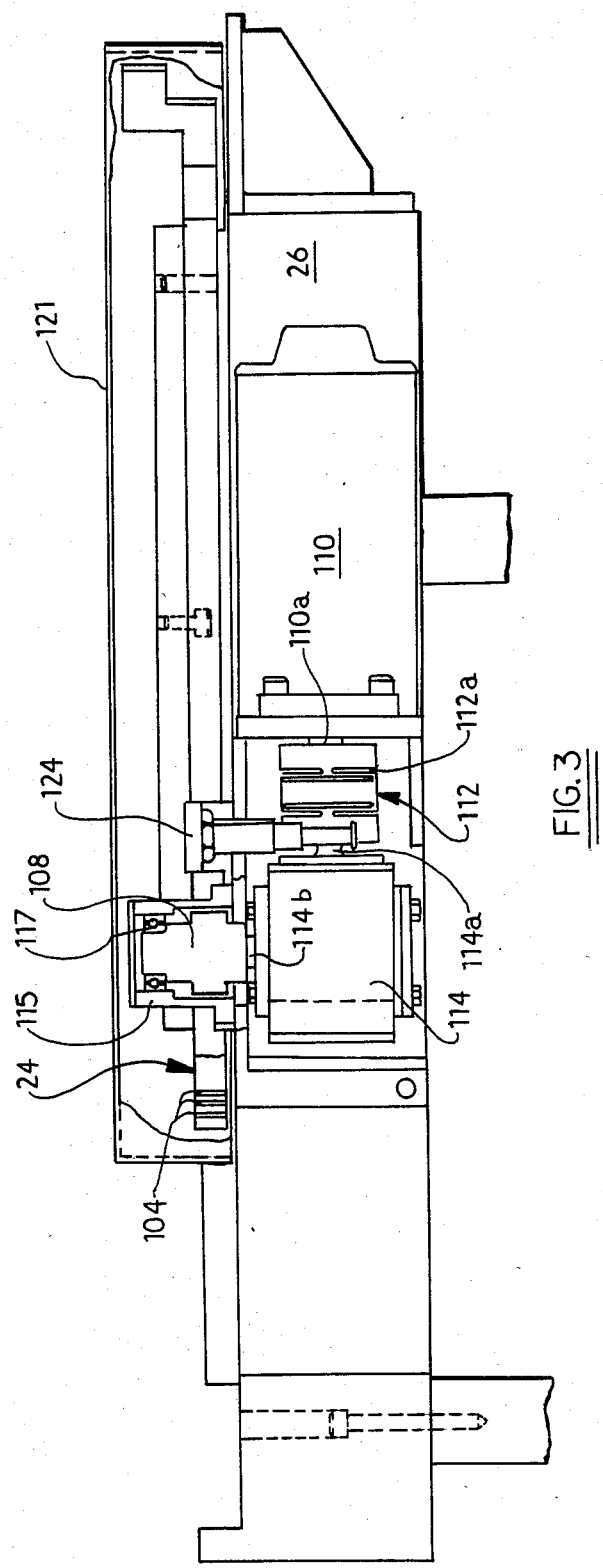
FIG. 3 is a plan view of the upper end (FIG. 2) of the support means and associated components.
Figure 8:
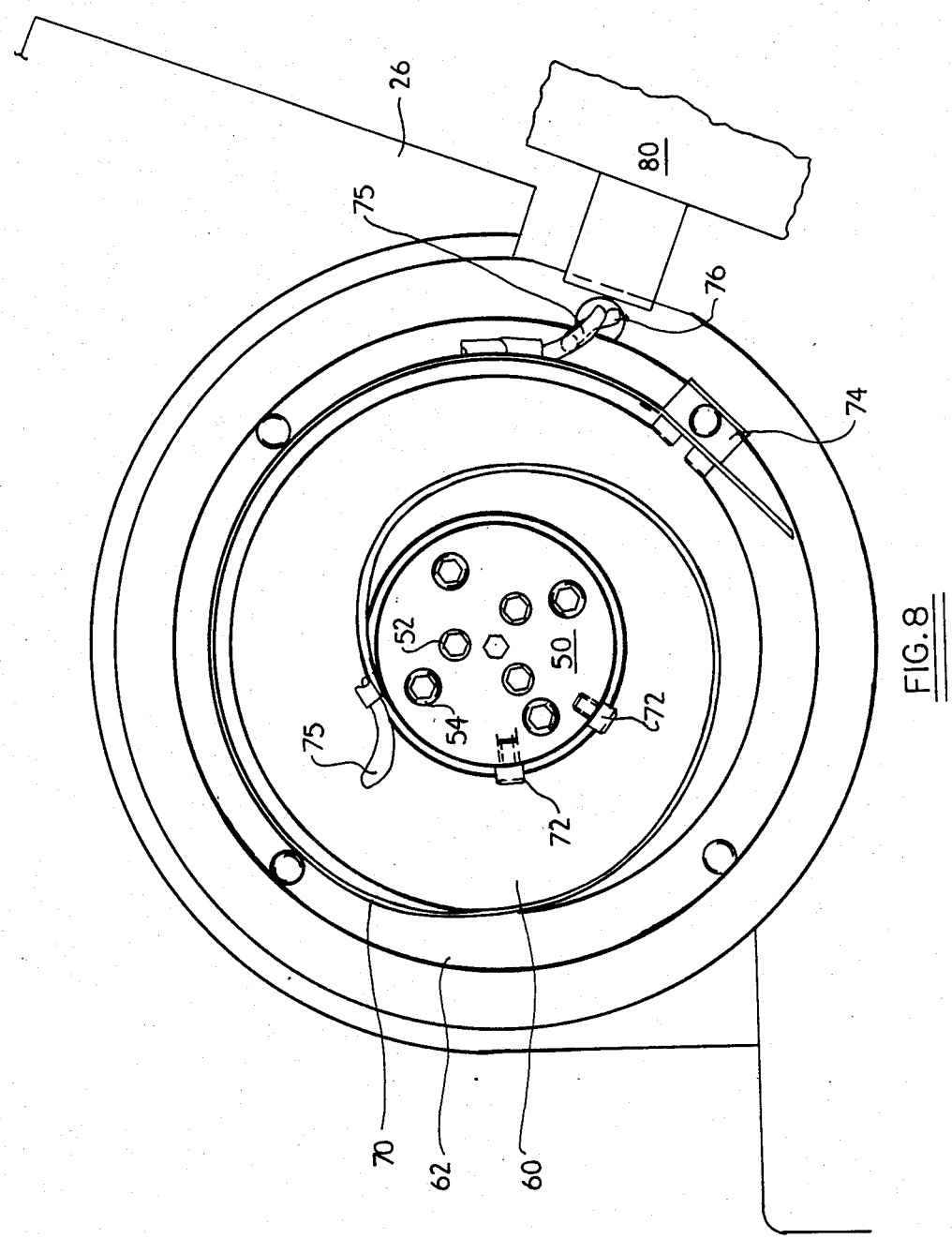
FIG. 8 is a bottom plan view of the rotor/stator arrangement around the pivot shaft.

As shown in FIG. 8, a helical return spring 70 is attached to the cap 50 and stator 62 by clamps 72, 74, respectively, and lead wires 75, 76 are attached to the rotor and stator and extend to feedback transducer 80 shown in FIGS. 1, 2 and 4. The rotor, stator and feedback transducer are of the commercially available type such as "INDUCTOSYN" rotary position transducer system available from Farrand Industries Inc. of 99 Wall Street, Valhalla, New York 10595 and will be described in further detail hereinbelow.

The support plate 24 includes a network of lubrication channels 82 concentric around the bore 24a thereof receiving the shaft 30, caps 40 and bushings 42, 44. Lubricant is introduced through opening 86 and passage 88 and exits through opening 90 extending from the bottom to the top of the support plate to an exit fitting (not shown).

Figure 9:
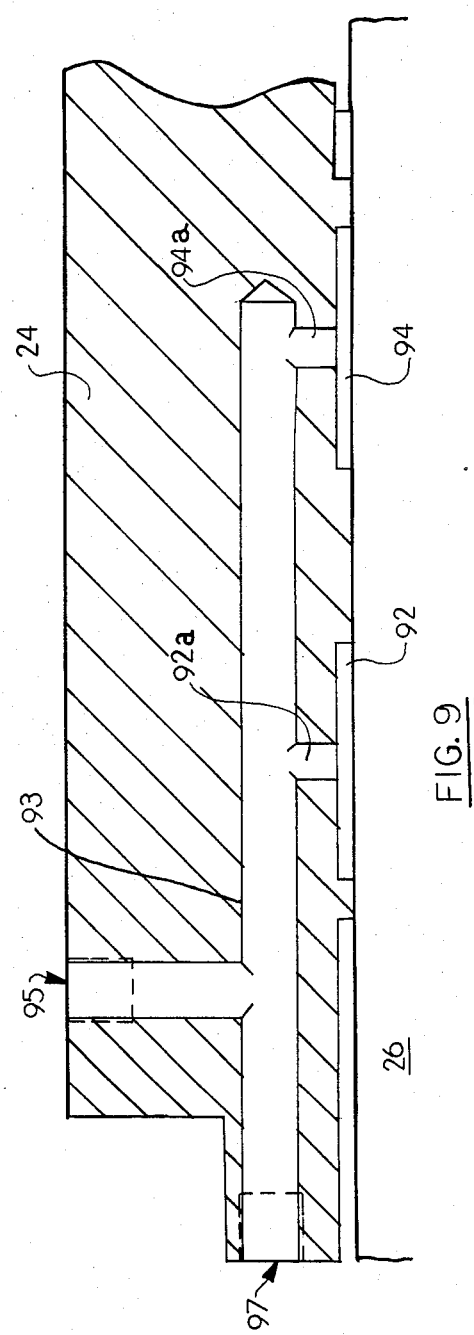
FIG. 9 is a partial cross-sectional view of the support means along line 9—9 of FIG. 6 but with the support means positioned over the base member in normal fashion.
Figure 10:
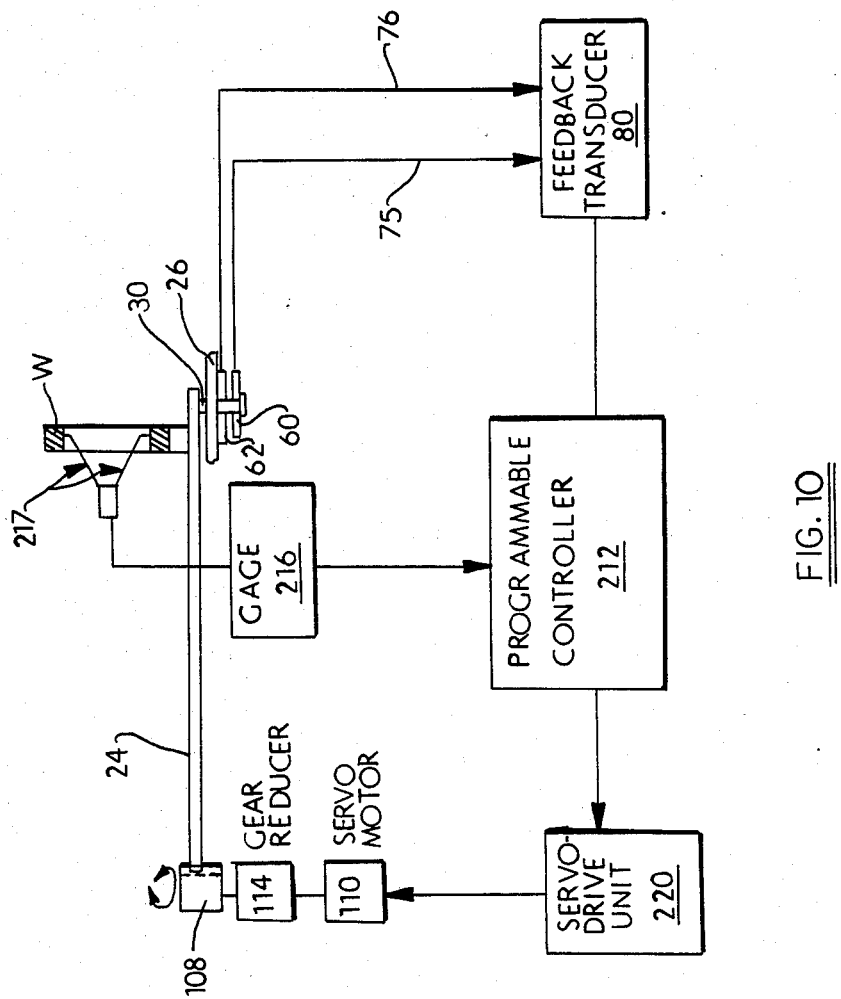
FIG. 10 is a schematic illustration of the control system of the support means for the workhead, and the use of gage means for adaptive control.

The other end of the workhead support plate 24 includes a set of channels 92, 94. Each channel includes opening 92a, 94a on opposite sides of the support plate 24 extending from the bottom of the plate to lateral passages 93 connected to an inlet fitting 95 and lubricant inlet fitting 97, FIG. 9. Pressurized air, e.g. 15 psi, is fed to the entrance openings 92a, 94a and functions in the channels to exert a lifting force on the support plate upward (in FIGS. 4 and 9) to reduce friction between the plate 24 and base member 26. It is apparent that the plate 24, base member 26 and channels 92, 94 form a lift means therebetween. Sealing to prevent pressurized air leakage from between the support plate 24 and base member is not necessary since lift of plate 24 does not actually occur. The mass of and on plate 24 is counterbalanced by air pressure to reduce friction. Leakage is minimal as a result of non-uniformities in the surface of base 26. The pressurized air or other fluid enters the openings 92a, 94a from the air inlet fittings 95 on the top of the plate and connected to a suitable source of air pressure. Of course, pressurized air is introduced into channels 92, 94 during pivoting of the support plate 24 to reduce friction. For example, the air lift mechanism described is designed to counter or bias about 95% of the mass or weight of the workhead and support plate. When the support plate is in position, the air pressure may be discontinued to eliminate the lifting force on the plate and allow clamping to be effected as discussed hereinbelow.

During clamping periods, lubricant may be introduced into channels 92, 94 through the same entrance openings 92a, 94a from lubricant inlet fittings 97 connected to a suitable lubricant source (not shown) such as an oil mist source. A conventional value arrangement (not shown) is used to alternately shut off the pressurized air flow or lubricant flow as required.

The workhead support plate ends in circular arc portion 102 having gear teeth 104 along the arc driven by the ing driving pinion 108, FIG. 2. The pinion 108 in turn is driven by a servomotor 110 connected to the pinion by a coupling 112 having slots 112a to provide flexibility to accommodate alignment errors between the servomotor output shaft 110a and input shaft 114a of gear reducer 114. Shims 113 are provided to help in obtaining proper alignment. The pinion 108 is disposed in cylindrical housing 115 and is rotatably supported therein by bearing 117 and driven by output shaft 114b of the gear reducer. There is a shear pin (not shown) between pinion 108 and output shaft 114b of gear reducer 114. A cover 121 is provided as shown to keep dirt and foreign matter out of these components.

Attached to opposite sides of the workhead support plate 24 are a first arm 120 and a second arm 122 which function to actuate proximity switch 124 as the support plate is pivoted. In this way, the extent of clockwise and counterclockwise rotation or pivoting of support plate 24 is controlled by shutting off servomotor 110 when the limits of movement dictated by the arms 120, 122 have been reached. The arms 120, 122 are affixed to the support plate 24 by screws 130, 132 respectively. With the arrangement shown, the support plate 24 is capable of pivotable movement up to 45° in the clockwise direction and 5° in the counterclockwise direction.

Also attached to opposite sides of the workhead support plate 24 intermediate its length are brackets 136, 138. A flexible bellows-like member 140, 142 is attached at one end to the brackets 136, 138, respectively, and at the other end to brackets (not shown) on the machine base member 26. It is apparent that one of the bellows memnbers 140, 142 will be expanded while the other is compressed when the support plate 24 is pivoted. The bellows members function to keep dust, dirt and foreign matter out of slots 150, 152 in the base member 26. Slots 150, 152 are configured in circular arcs for purposes to be described.

Figure 7:
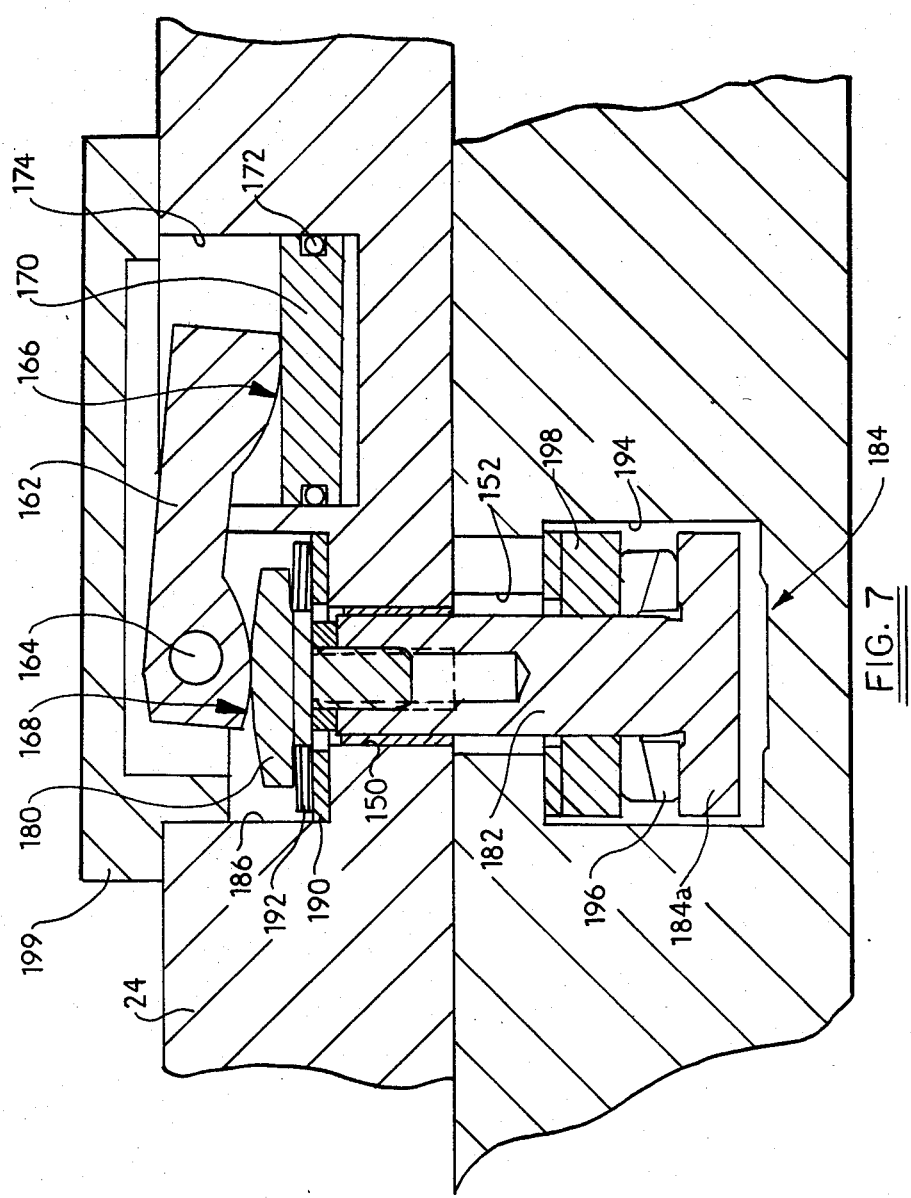
FIG. 7 is a partial cross-sectional view of the releasable clamp.

As shown in FIG. 2, the workhead support plate 24 includes a pair of releasable clamps 160 shown in more detail in FIG. 7. Each clamp 160 includes a lever 162 pivotable about a shaft 164 mounted in the support plate 24 and including a first cam surface 166 and second cam surface 68 at opposite ends. The cam surface 166 is engaged by a piston 170 having O-ring seal 172. The piston rides in a circular counterbore 174 and is pressurized by air or other fluid pressure to cause the piston to move in the bore. Air pressure is supplied by passages 176 in the support plate 24 extending to a fitting (not shown) at the circular arc portion thereof. A suitable source of air pressure is connected to each fitting.

The second cam surface 168 engages the head 180 screwed into the shaft 182 of a T-shaped plunger 184 received in slot 150 in plate 24. The head 180 is disposed in a circular counterbore 186 in the support plate and an annular spacer 190 and annular spring washers 192 are located between the head 180 and bottom of the counterbore 186 as shown.

Similarly, the head 184a of the T-shaped plunger 184 is located in a circular counterbore 194 in the base member 26 and is spaced from the top of the counterbore by a spherical washer 196 and equalizing washer 198. Each clamp 160 includes a cover 199 attached to the top of the support plate 24.

Each clamp 160 is operable to clamp the workhead support plate 24 to the base member 26 when the air pressure to counterbore 174 is released so that the force of spring washers 192 can exert a clamping force between the support plate 24 and base member 26 through the head 180 and T-shaped plunger 184. The clamping force is released by pressurizing the counterbore 174 to cause the piston 170 to move upwardly in FIG. 7 and cause the lever 172 to pivot counterclockwise about shaft 164 and depress the head 180 against the force of the spring washers 192. This action disengages the head 184a of the plunger from the spherical washer 196, releasing the clamping force between support plate 24 and base member 26. During pivoting of support plate 24, the shaft 182 of plunger 184 is carried through slot 152 in the base member 26.

As mentioned hereinabove, the machine control means includes a rotary position feedback transducer arrangement with rotor 60 affixed to pivot shaft 30 and rotatable therewith and stator 62 affixed to the machine base 26 adjacent but spaced from the rotor. The rotor and stator are each connected electrically to the feedback transducer 80 which as mentioned is available under the name "INDUCTOSYN" from Farrand Controls, a division of Farrand Industries Inc. of 99 Wall Street, Valhalla, New York 10595. The feedback transducer arrangement incorporates an "absolute zero" proximity switch 200 including a switch actuator arm 202 affixed to the front (FIG. 4 or left side in FIG. 2) side of the workhead support plate 24 by bracket 204 and screws 206. The pulse received from the rotor/stator arrangement next after the switch 200 signals during travel in one direction is taken as the arbitrary "zero" reference for all angle measurements. With the feedback transducer described, the support plate 24 can be positioned within plus or minus 4 arc seconds of resolution.

The control means also includes a suitable controller 212, programmable or other types, which receives signals from the feedback transducer 80 regarding angular position of the workhead support plate 24 and which processes these signals into selected programs stored in the controller memory in known fashion. The programmable controller in one mode of operation may dictate a discrete charge in angular position, either at the start of a run of workparts requiring a taper angle different from that required by a previous run of workparts or during the run to provide different taper angles on the same workpart. Typically in the latter situation, the controller 212 would have stored thereon grinding programs for several different configurations of workparts. And, the controller 212 could be programmed to control the servomotor 110 to drive the workhead support plate 24 in a substantially continuous angular pivoting manner to provide contour workpart grinding. In this situation, the clamps 160 would be released during pivoting and the air lift fixture would either not be used or would be used at possibly a reduced level.

In another mode of operation, a gaging means 216, for example, including gaging fingers 217 or other mechanisms to determine the inner diameter of workpart W is employed on the machine to measure the actual angle ground on the workpart surface and inputs signals to the controller 212. Or, the gaging means could measure some other process parameter such as grinding force or coolant temperature. Such gaging means are known in the art. The signals from the gaging means would be fed to the controller with an adaptive control system so that the controller varies the angular position of the workhead support plate 24 to bring the measured parameter to the desired value.

Any suitable programmable controller may be used, such as a TEACHABLE II programmable controller available from Bryant Grinder Corporation, Springfield, Vermont, the assignee hereof. Other controllers useful in the invention include known electronic positioning control systems such as CNC (computer numerical control) and NC (numerical control). Suitable controllers include Allen Bradley 7300 CNC, Bendix System 5 CNC or Modicon 2184 controllers.

The servomotor 110 may be driven through any suitable servo drive unit 220 such as, for example, a servo drive of Hyper Loop, Inc. of 7459 West 79th Street, Bridgeview, Illinois 60455, sold under the trademark "HYAMP". The "HYAMP" servo drive is a single-phase, four wave, bidirectional SCR controlled servo drive for D.C. motors, and it provides D.C. drive power for precise speed control and regulation over a wide spaced range. Another suitable servo-Drive, designated as Size 50, is available from General Electric Company, 685 West Rio Road, Charlottesville, Virginia 22906.

While the grinding machine of the invention has been described above as having a workhead support plate pivotable over a 50° range, it will be understood that lesser or greater angular movement may be provided including a workhead support plate which is pivotable or rotatable 360°. Furthermore, the position indicating means may comprise other known systems for sensing angular movement such as known laser feedback systems for excellent position accuracy and also known encoder feedback systems.

While the grinding machine of the invention has been described by a detailed description of certain specific and preferred embodiments, it is understood that various modifications and changes can be made in any of them within the scope of the appended claims which are intended to also include equivalents of such embodiments.

We claim:

1. In a grinding machine having a wheelhead with a grinding wheel rotatable about an axis and a workhead with workpart fixturing means holding a workpart on another axis, said wheelhead and workhead being carried on machine member means, the combination of
    (a) a workhead support means on which the workhead is carried, said support means including a pivotable shaft means rotatably mounted on the machine member means by bearing means and on which the support means is pivoted relative to the wheelhead to vary the angular relationship of the workpart axis relative to the grinding wheel axis and including a driven portion remote from the pivotable shaft means,
    (b) means drivingly engaging the driven portion of workhead support means remote from the pivotable shaft means for pivoting the workhead support means and its pivotable means,
    (c) means for controlling the angular position of the workhead support means and workhead thereon, including rotary shaft position indicating means on and rotatable with the shaft for determining the angular position of the workpart axis by indicating angular movement of the pivotable shaft means of said workhead support means with respect to a reference position and means for actuating the pivoting means to pivot the workhead support means on its pivotable means until the position indicating means indicates that a position is reached corresponding to a desired angular relationship of the workpart axis to the grinding wheel axis, and
    (d) fluid lift means between the workhead support means and machine member means remote from the pivotable shaft means adjacent the driven portion to counterbalance mass of the workhead support means and workhead thereon during pivoting.

2. The combination of claim 1 wherein the controlling means further includes an electronic controller means and the pivoting means is under the control of the controller means to pivot the workhead support means on its pivotable means until the position indicating means indicates that a position is reached corresponding to a desired angular relationship of the workpart axis to the grinding wheel axis.

3. The combination of claim 1 wherein the controller means is a programmable controller.

4. The combination of claim 3 wherein the programmable controller is programmed to substantially continuously pivot the workhead support means on its pivotable means until the position indicating means indicates that the support means has pivoted from a first to a second position corresponding to a programmed first relationship and programmed second relationship of the workpart axis to the grinding wheel axis.

5. The combination of claim 1 wherein the controlling means further includes an adaptive control means having a gaging means for measuring a grinding parameter with respect to a reference parameter and wherein the means for actuating the pivoting means is responsive to the gaging means to pivot the workhead support means on to pivotable means until the position indicating means indicates that a position is reached corresponding to an angular relationship of the workpart axis to the grinding wheel axis providing the desired grinding parameter.

6. The combination of claim 1 which further includes having spring biased clamp member releasable clamp means between the workhead support means and machine member means for clamping the workhead support means to the machine member means to maintain a desired position between the workpart axis and grinding wheel axis and having fluid pressure actuated means to release clamping to allow pivoting of the workhead support means relative to the machine member to another position.

7. The combination of claim 6 wherein the releasable clamp means includes a pivotably mounted lever means on the workhead support means, a fluid pressure piston means on the workhead support means to actuate the lever means, a clamping means actuated by the lever means and extending between the workhead support means and machine member means, and spring means biasing the clamping means to clamp the workhead support means and machine member means together when the lever means is not actuated by the piston means and means to fluid pressure actuate the piston means and cause the lever means to actuate the clamping means counter to the spring bias to unclamp the workhead support means and machine member means.

8. The combination of claim 1 wherein the fluid lift means comprises channel means in the workhead support means facing the machine member means and a source of fluid pressure in communication with the channel means to provide fluid pressure thereto.

9. The combination of claim 8 wherein the fluid pressure source is a source of pressurized gas.

* * * * *